S. Reed.
Animal-Trap.
Nº 73384.      Patented Jan. 14, 1868.

Witnesses
Thos. T. Parker
E. J. Brown

Inventor
Samuel Reed
By his atty.
J. S. Brown

United States Patent Office.

SAMUEL REED, OF WHITESTOWN, PENNSYLVANIA.

Letters Patent No. 73,384, dated January 14, 1868.

---

IMPROVED ANIMAL-TRAP.

---

*The Schedule referred to in these Letters Patent and making part of the same.*

---

TO ALL WHOM IT MAY CONCERN:

Be it known that I, SAMUEL REED, of Whitestown, in the county of Butler, and State of Pennsylvania, have invented an Improved Animal-Trap; and I do hereby declare that the following is a full and exact description thereof, reference being had to the accompanying drawings, making part of this specification—

Figure 1:
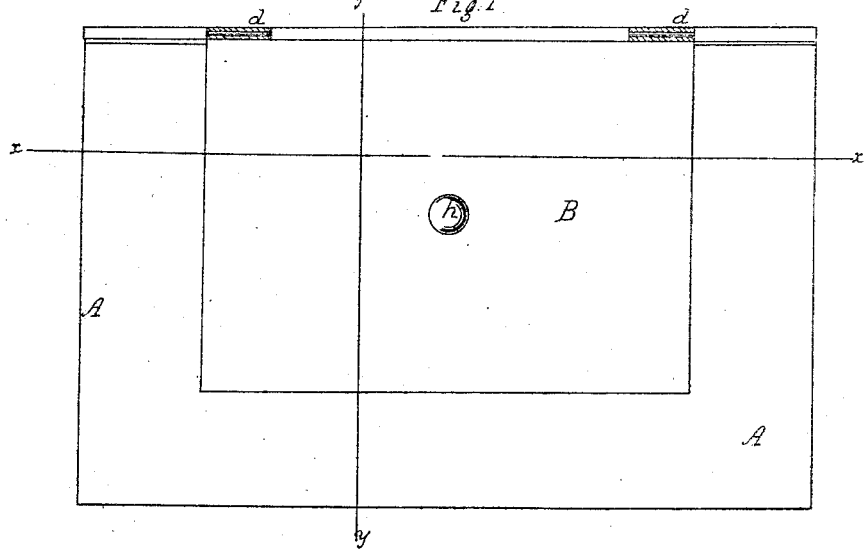

Figure 1 being a top view of the trap.

Figure 2:
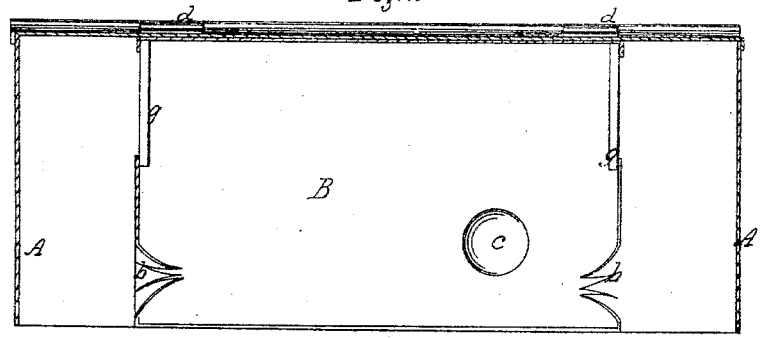

Figure 2, a longitudinal vertical section thereof, in a plane indicated by the line $x\ x$, fig. 1.

Figure 3:
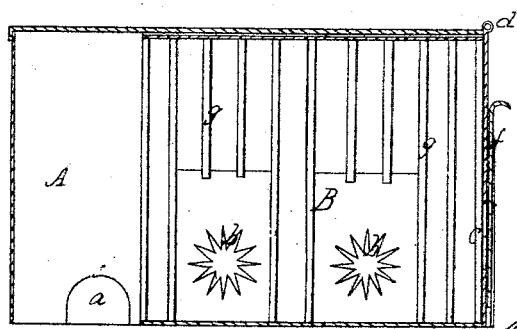

Figure 3, a transverse vertical section of the same, in a plane indicated by the line $y\ y$, fig. 1.

Like letters designate corresponding parts in all of the figures.

This invention, as its leading feature, consists in the combination of a surrounding and covering-box or vestibule, A, with the interior box or trap proper, B, the said vestibule having entrances for the free ingress and egress of the rats and mice, thereby removing suspicion, and concealing the real character of the trap to those not caught, even though some may be already caught in the trap itself.

To carry out the full purpose of this improvement, both the trap and vestibule should be of ample dimensions. Thus, for rats, I prefer to make the trap B, say, two feet long, eighteen inches wide, and eight inches high; and the vestibule three feet long, two feet wide, and a little more than eight inches high; and, therefore, as the vestibule does not project beyond the trap at the back, there will be a space within it six inches wide all around the front and ends of the trap. The vestibule is hinged to the trap at $d\ d$, on the upper rear corner thereof, so that it may be readily lifted up and thrown back from over the trap at any time. These hinges may be simply hooks, or of other construction, which will allow the vestibule to be entirely removed if desired. There is no bottom to the vestibule, and there are in its lower edge one or more arched or smooth openings or doorways, $a$, of proper size for the free ingress and egress of the animals. Into the inner box or trap proper, B, there are openings, $b\ b$, one or more, from the vestibule. These openings are surrounded by points projecting inward, and converging slightly, so that the animals cannot return through the openings when they have once entered. The box may be made of tin or grated with wires, $g\ g$. There may be openings, $h$, in the top of the trap, for dropping meal or other bait therein. There is also an aperture, $c$, in the back side, covered by a sliding door, $f$, for gaining access to the interior of the trap, to remove the animals when caught.

What I claim as my invention, and desire to secure by Letters Patent, is—

The combination of the hinged vestibule A and trap B, constructed and arranged substantially as and for the purpose herein specified.

The above specification of my improved animal-trap signed by me, this 4th day of March, 1867.

SAMUEL REED.

Witnesses:
   WM. S. ZIEGLER,
   JOHN CARNER.